(12) United States Patent
Bergere (10) Patent No.: US 9,119,339 B2
(45) Date of Patent: Sep. 1, 2015

(54) PNEUMATIC SEEDER COMPRISING MEANS FOR DAMPING AND/OR DIVERTING THE FLOW OF EXTRACTED AIR COMING FROM THE SUCTION FAN

(71) Applicant: Ribouleau Monosem, Lergeasse (FR)

(72) Inventor: Caroline Bergere, Bressuire (FR)

(73) Assignee: Ribouleau Monosem, Largeasse (FR)

( * ) Notice: Subject to any disclaimer, the term of this patent is extended or adjusted under 35 U.S.C. 154(b) by 29 days.

(21) Appl. No.: 13/913,000

(22) Filed: Jun. 7, 2013

(65) Prior Publication Data

US 2013/0327261 A1 Dec. 12, 2013

(30) Foreign Application Priority Data

Jun. 7, 2012 (FR) .................................... 12 55326

(51) Int. Cl.
*A01C 7/08* (2006.01)
(52) U.S. Cl.
CPC ................. *A01C 7/082* (2013.01); *A01C 7/081* (2013.01)
(58) Field of Classification Search
USPC ...................... 111/170, 174–185, 200; 454/67
See application file for complete search history.

(56) References Cited

U.S. PATENT DOCUMENTS

| 2,445,162 | A * | 7/1948 | Wallace | 56/34 |
| 2,942,396 | A * | 6/1960 | Farnam | 56/13.4 |
| 2010/0107945 | A1 * | 5/2010 | Beaujot | 111/176 |
| 2011/0000409 | A1 * | 1/2011 | Wilhelmi et al. | 111/130 |

FOREIGN PATENT DOCUMENTS

| DE | 102005024739 A1 | 12/2006 |
| EP | 2147588 A1 | 1/2010 |

OTHER PUBLICATIONS

Ruling of Jan. 13, 2009 on the conditions of coating and use of seeds treated with the products listed in Article L.253-1 of the French Rural Code with a view to limiting the emission of dust during the factory treatment process.
Ruling of Apr. 13, 2010 modifying the ruling of Jan. 13, 2009 on the conditions of coating and use of seeds treated with the products listed in Article L.253-1 of the French Rural Code with a view to limiting the emission of dust during the factory treatment process.
French Search Report and Written Opinion dated Dec. 6, 2012 for corresponding French Patent Application No. 1255326, filed Jun. 7, 2012.

* cited by examiner

*Primary Examiner* — Alicia Torres
(74) *Attorney, Agent, or Firm* — David D. Brush; Westman, Champlin Koehler, P.A.

(57) ABSTRACT

A pneumatic seeder is provided, which is configured to be fixedly attached to a farming machine. The seeder includes an element for contacting with the ground, an element for storing a product to be sown, a pneumatic distributor of said product, a suction fan having at least one air inlet connected to the pneumatic for distributor and at least one air discharge outlet, an air extractor connected to the discharge outlet, the end of the air extractor leading out to face the ground. The seeder includes a damper and/or diverter for damping and/or diverting the flow of air coming from the air extractor. The damper and/or diverter is placed downstream from the end of the air extractor.

10 Claims, 5 Drawing Sheets

PNEUMATIC SEEDER COMPRISING MEANS FOR DAMPING AND/OR DIVERTING THE FLOW OF EXTRACTED AIR COMING FROM THE SUCTION FAN

1. FIELD OF THE DISCLOSURE

The field of the disclosure is that of the designing and making of farming implements for distributing seed on cultivable surfaces.

The disclosure more particularly pertains to such implements comprising means for pneumatic seed distribution.

2. PRIOR ART

Farmers classically use farming implements to seed their cultivable surfaces. These implements include seeders used to distribute seed.

Figure 1:
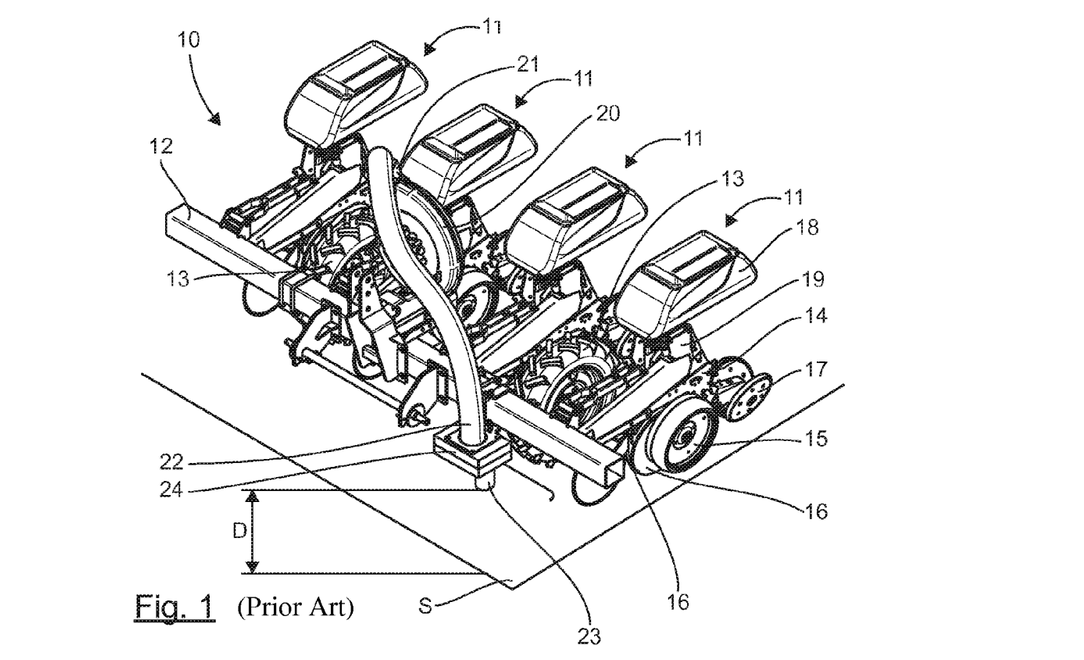
FIG. 1 illustrates a front view in perspective of a pneumatic seeder according to the prior art.

Thus, as shown in FIG. 1, a seeder 10 generally comprises several seeding elements 11. These seeding elements 11 are fixedly attached side by side to a frame 12 that rests on the ground by means of wheels 13, and is intended to be fixedly attached behind a tractor.

Each seeding element 11 has a mount 14 which rests on the ground by means of a pair of gauge wheels 15 between which a pair of disc openers 16 is placed. A rear block 17 comprising two tilted wheels is fixedly attached behind the mount 14. Each seeding element 11 also comprises seed storage means, such as for example a reservoir 18, the outlet of which communicates with the seed distribution means 19.

The seed distribution means 19 can be of a pneumatic type. The present disclosure more particular relates to seeders comprising pneumatic distribution means, also called pneumatic seeders.

The pneumatic distribution means 19 conventionally comprise a box within which a disc is mounted so as to be mobile in rotation. This disc has perforations passing through it. These perforations are made appreciably on its periphery along a same circle. The disc demarcates two compartments within the box. One of these compartments communicates with the outlet of the reservoir 18 and a seed distribution channel which leads out in between the disc openers 16. The other compartment communicates through a tube with an inlet of a suction fan fixedly attached to the frame 12.

The suction fan 20 has several inlets, each of which can be connected to the pneumatic distribution means of the different seeding elements 11 of a same seeder 10. The suction fan 10 comprises an air discharge outlet 21 pointed upwards, in other words appreciably towards the sky, when the seeder rests on its wheels 13.

When the seeder 10 is moved on a cultivable surface, for example, by means of a tractor behind which it is fixedly attached, the disc openers 16 cut out a furrow into this surface. The depth of the furrow depends on the position of the gauge wheels 15. At the same time, the suction fan 20, which is for example connected to the power output connection of the tractor or to a motor, for example a hydraulic motor, is put into action in order to generate low pressure within the compartments demarcated in the box by the perforated disc. The seed contained in the reservoir 18 is then sucked out and gets housed before the perforations provided for this purpose on the perforated disc, the size of these perforations being smaller than that of the seed. A selector ensures that only one seed is placed in each perforation. The perforated disc rotates inside the box which includes a zone not subjected to low pressure. Each time that a perforation of the disc is in this zone, the corresponding seed is no longer pressed against the disc and drops into the distribution channel until it gets housed in the furrow previously opened out by the disc openers 16. The seeds are thus deposited in the furrow one by one. While the seeder 10 continues to move on the ground, the rear block 17 closes up the furrow after the seeds have been deposited in it.

The seeding element described here above rests on the ground by means of gauge wheels. However, the present disclosure can also be applied to any type of single-seed seeding element, i.e. an element seeding seeds one by one, such as for example shoe seeders or plowshare seeders.

The air sucked out of the pneumatic distribution means by the suction fan 20 in order to generate low pressure therein is extracted from the suction fan 20 through the discharge outlet 21.

This air can be charged with particles of chemical products which coat this seed. The products are, for example, insecticides which get detached by abrasion.

Studies have shown that, because of the speed at which the air is expelled from the discharge outlet 21 of the suction fan 20, and sometimes under the effect of wind, these particles can get propagated in the atmosphere to several tens or even hundreds of meters from the discharge outlet 21 of the suction fan 20.

These particles can be harmful to animal and seed life as well as to farmers seeding cultivable surfaces.

Standards, for example in force in Europe, have therefore been drawn up to limit the propagation of these particles in the atmosphere and to limit their effect on the environment. These standards (especially the French decree dated 13 Apr. 2010 modifying the decree of 13 Jan. 2009 on conditions of coating and use of seed treated by products mentioned in article L.253-1 of the Rural Code (code rural) with a view to restricting the emission of dust during the method of treatment in factory) lay down in particular that air coming from the discharge outlet 21 of the suction fan 20 should be expelled to a distance of 20 to 30 centimeters from the ground.

To meet these requirements laid down by the standards, the present Applicant has devised a technical solution in which the outlet or discharge outlet 21 of the suction fan 20 is connected to a conduit 22, the outlet 23 of which leads out into a position facing the ground S at a distance D of 20 to 30 centimeters from its surface. The outlet 23 is therefore oriented towards the surface of the ground S. A decompression box 24 is generally placed upstream from the outlet 23 in order to reduce the speed of the expelled air.

This solution has the advantage of reducing the propagation of harmful particles into the atmosphere in proportions such as to meet the constraints laid down by the standards on the extraction of air from the suction fans of the pneumatic seeders, in force especially in Europe. This solution can however be further improved.

3. DRAWBACKS OF THE PRIOR ART

The running of the tractor and of the seeder on the ground and the tilling operations are accompanied by a raising of dust around the tractor-seeder unit. The expulsion of air coming from the suction fan close to the ground and towards its surface plays a part in amplifying this raising of dust.

This raising dust however is detrimental to the efficient working of the seeder. Indeed, this dust can penetrate the different components of the seeder, such as its distribution means, its linking means to the ground, i.e. the elements by which it rests on the ground, its control units (for example a seed monitor having photoelectrical cells) and can affect their operational state, especially that of the chains, the sliding parts and the seed-counting sensors. Furthermore, the dust formed around the tractor can be so dense that it causes visual difficulties for its driver. These difficulties can be such that they prevent the driver from appropriately following the trace of the row markers implemented to make parallel and regular passages for the tractor. The seeding is then not done with precision.

4. SUMMARY

An exemplary embodiment of the disclosure relates to a pneumatic seeder intended to be fixedly attached to a farming machine, said seeder comprising linking means to the ground, means for storing a product to be sown, means for pneumatic distribution of said product, a suction fan comprising at least one air inlet connected to said means for distribution and at least one air discharge outlet, means for extracting air connected to said discharge outlet, the end of said means for extracting leading out to face the ground.

According to an embodiment of the invention, a seeder of this kind comprises means for damping and/or diverting the flow of air coming from said means for extracting, said means for damping and/or diverting being placed downstream from the end of said means for extracting air, i.e. between the end of said means for extracting air and the ground.

Thus, an embodiment of the invention relies on a wholly original approach which consists in providing for the implementation of means to dampen and/or divert the flow of air extracted from the suction fan of a pneumatic seeder before it meets the ground.

In its path, the flow of air escaping from the suction fan meets the means for damping and/or diverting at its exit from the means for extracting. This flow is dampened and/or split up and/or its speed is reduced and/or its path is diverted. The kinetic energy of this flow of air is then at least partly absorbed by the means for damping and/or diverting before it meets the ground. Thus, the raising of dust around the seeder, as well as its drawbacks which are inherent thereto, are prevented or, at the very least, limited.

The means for damping and/or diverting can include at least one element forming an obstacle between the end of the means for extracting and the surface of the ground. At its exit from the means for extracting, the air coming from the suction fan meets, on its path, the element forming an obstacle, in contact with which its flow is slowed down and/or split up and/or diverted and/or dampened. The element or elements forming an obstacle could be made out of a rigid material and preferably made out of a flexible material to improve the effect of damping the flow of air.

According to an advantageous embodiment, said means for damping and/or diverting comprise a first wall extending essentially in parallel to the ground downstream from said end.

The flow of air coming from the end of the means for extracting encounters this wall, in contact with which it is at least partially dampened and/or split up and/or its speed is reduced and/or its path is diverted advantageously not directly towards the ground, i.e. not perpendicularly to the ground, but inclinedly, preferably essentially in parallel to its surface and/or upwards, i.e. in directions opposite to the ground. Thus, the raising of dust around the seeder is prevented or, at the very least, restricted.

According to this variant, the seeder preferably comprises an element having an essentially L-shaped section, the first wall being constituted by one of the arms of said element.

This mechanical structure with a simple architecture restricts or even eliminates the raising of dust both around the seeder and around the tractor, especially when the L-shaped arm which is not substantially parallel to the surface of the ground but, on the contrary, substantially perpendicular to it, extends from the front side of the seeder, i.e. in the sense of its progress. In this case, this portion acts as a barrier, which the flow of air hits against preventing its movement, at least to a great extent, towards the vehicle that is putting the seeder into motion.

Advantageously, said means for damping and/or diverting comprise a flap having a portion or a wall that is designed to rest at least partly on the surface of the ground S.

According to another advantageous embodiment, said flap comprises a lower portion designed to come at least partly into contact with the ground S and an upper portion, said upper and lower portions being distant from each other to define at least one hollow interior space.

The flap thus constitutes a sort of damping cushion that further improves the damping of the flow of air at exit from the means for extracting. Consequently, the formation of a dust cloud around the seeder is even further reduced.

According to an advantageous variant, the flap comprises a first end which is fixedly attached in the region of the end of the conduit on the side oriented towards the direction of progress of the seeder.

This first end of the flap then acts as a barrier that prevents or at least greatly limits the flow of air towards the front of the seeder, i.e. towards the machine that makes it to move. This mechanical structure with a simple architecture then limits or even eliminates the raising of dust around the seeder and around the tractor.

According to another advantageous variant, said lower and upper portions of the flap are preferably kept distant from each other by means of a spacer.

This approach makes it possible to form at least one hollow, interior space simply and economically between the upper and lower portions of the flap. These spacers can also constitute flow-guides to divert the flow of air in preferred directions, for example laterally or towards the rear of the seeder (relative to the direction of progress).

Said spacer or spacers preferably extend along axes essentially perpendicular to the axis of movement of the seeder on said ground S and essentially parallel to the surface of the ground S.

They will then act as flow-guides to divert the flow of air laterally on either side of the flap. This contributes to further limiting the flow of the air towards the machine that provides for the movement of the seeder and thus to preventing the formation of a cloud of dust around the seeder.

Said means for damping and/or diverting are preferably made, at least partly, out of a flexible material.

The use of a material having a certain degree of flexibility gives the means for damping and/or diverting good properties of damping the flow of air that comes into contact with it.

The flexible material belongs for example to the group comprising:
elastomers;
foams;
woven or non-woven materials such as canvas, sheets of leather, etc.

According to another advantageous embodiment, said means for damping and/or diverting comprise a superimposition of a plurality of screens extending essentially in parallel to the ground and downstream from said end.

It is thus possible to efficiently dampen the flow of air coming from the means for extracting and/or at least one part of this flow bouncing off the ground.

In this case, the mesh size of said screens preferably decreases from the screen closest to said end up to the screen closest to said ground.

It is thus possible to dampen the flow of air to such an extent that its speed when it encounters the surface of the ground can be zero or at least very low, thus greatly limiting the raising of dust.

According to another advantageous embodiment, the mesh size of said screens increases from the screen closest to said end up to the screen closest to said ground.

Thus, the flow of air extracted from the end of the means for extracting has greater difficulty in getting propagated upwards after having bounced off the ground. Indeed, on its path, it crosses the screens, in contact with which it is slowed down. Thus, the raising of dust is reduced.

The end of said means for extracting preferably opens out at a distance D from the ground ranging from 20 to 30 centimeters.

The raising of dust can thus be reduced in proportions such that the technique according to an embodiment of the invention meets standards on the discharge of air extracted from the suction fans of pneumatic seeders in force on the date of filing, especially in France.

An embodiment of the present invention also pertains to means for damping and/or diverting for seeders according to any one of the variants mentioned here above, said device comprising means for damping and/or diverting the flow of air coming from said means for extracting, said means for damping and/or diverting being designed to be placed downstream from said means for extracting air.

An embodiment of the present invention also pertains to a farming machine equipped with such a seeder.

5. LIST OF FIGURES

Other features and advantages shall appear more clearly from the following description of embodiments given by way of simple, illustratory and non-exhaustive examples and from the appended drawings, of which.

6. DESCRIPTION OF ILLUSTRATIVE EMBODIMENTS

6.1. Reminder of an Exemplary General Principle of the Disclosure

A general principle of an exemplary embodiment includes implementing, downstream from the end of the means for extracting, means to dampen and/or divert the flow of air extracted from the suction fan of a pneumatic seeder before it meets the ground.

The flow of air coming out of the suction fan is then dampened and/or diverted and/or divided and/or slowed down at its exit from the means for extracting before it meets the ground. The kinetic energy of the flow of air is then at least partly absorbed before it meets the ground. Thus, an embodiment of the invention prevents or at the very least limits the raising of dust around the seeder as well as the drawbacks inherent thereto.

6.2. Example of a First Embodiment of a Seeder

6.2.1. Architecture

Figure 2:
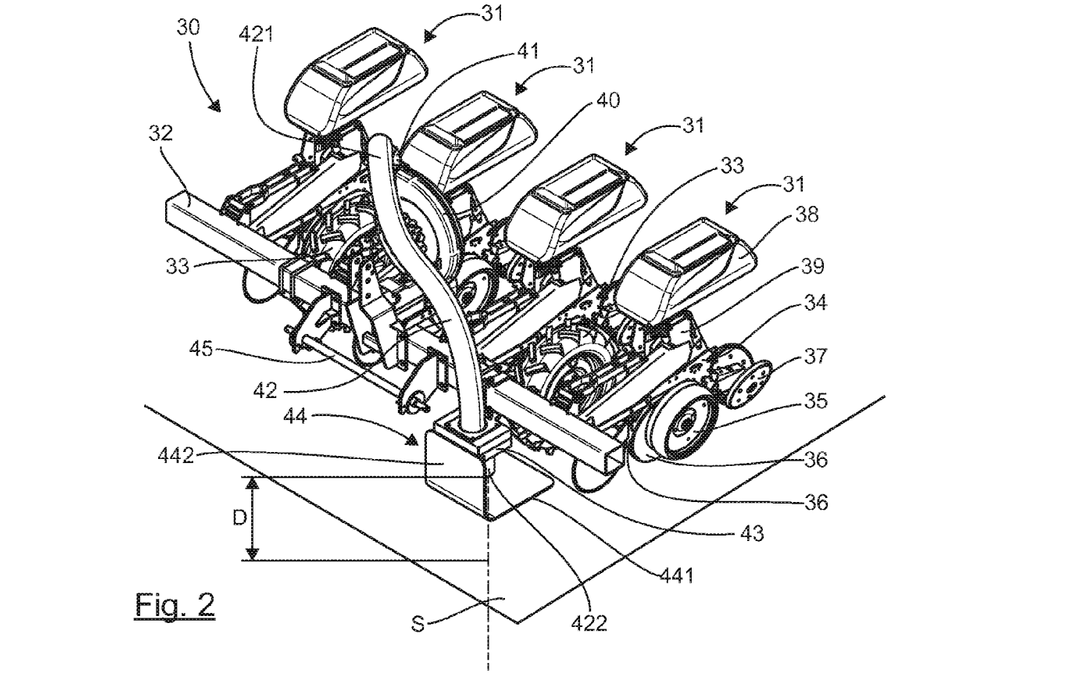
FIG. 2 illustrates a front view in perspective of a pneumatic seeder according to a first embodiment of the invention.
Figure 3:
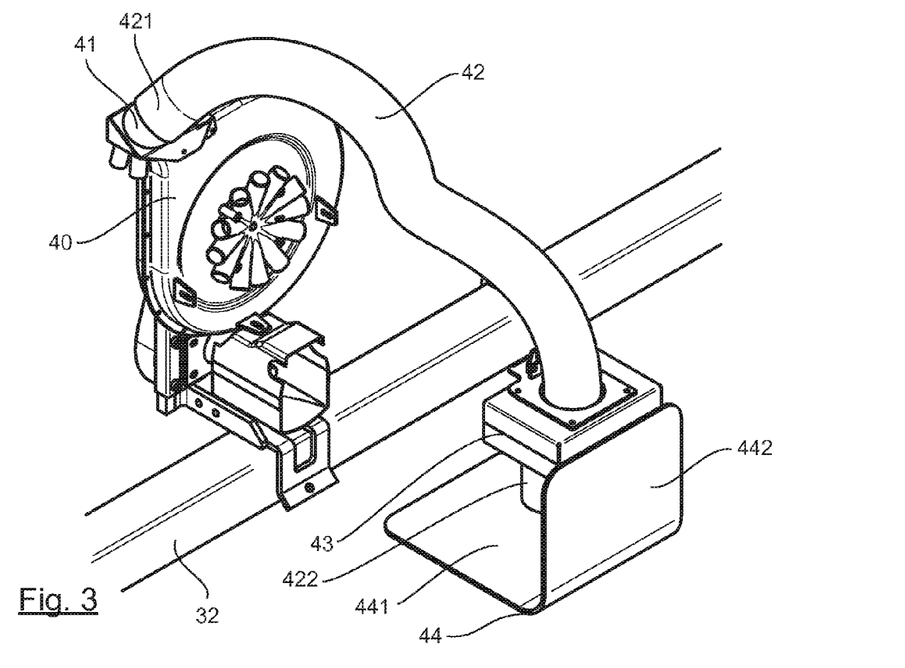
FIGS. 3 and 4 respectively illustrate a front view in perspective and a side view providing a detailed view of the damping and/or diverting means of the seeder shown in FIG. 2.
Figure 4:
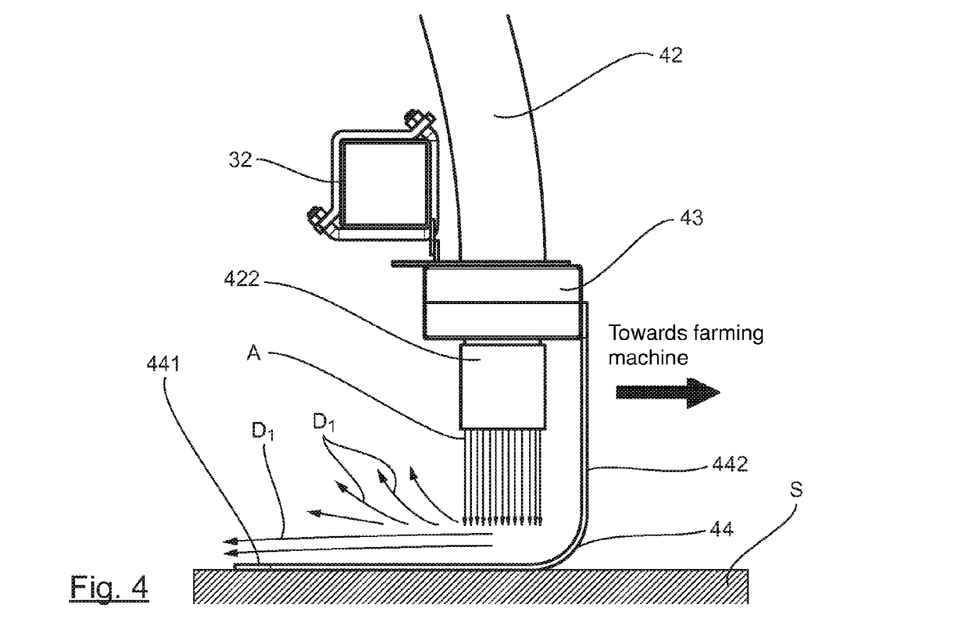

Referring now to FIGS. 2 to 4, we present one embodiment of a pneumatic seeder according to the invention.

Thus, as shown in FIG. 2, a seeder 30 of this kind comprises several seeding elements 31, in this case four of them. In variants, the number of seeding elements 31 could be greater or smaller than four. These seeding elements 31 are fixedly attached side by side to a frame 32. This frame 32 rests on the ground by means of wheels 33 and is to be fixedly attached to a farming machine such as a tractor (not shown) through a fixed attachment 45 provided for this purpose.

Each seeding element 31 has a mount 34 which rests on the ground by a pair of gauge wheels 35 between which there is placed a pair of disc openers 36. A rear block 37 comprising two tilted wheels is fixedly attached to the rear of the mount 34. Each seeding element 31 also has means for storing seed, such as for example a reservoir 38, the outlet of which communicates with seed distributing means 39.

The seed distributing means 39 are of a pneumatic type such as those commercially distributed by the Applicant. They classically comprise a box within which a disc is mounted so as to be mobile in rotation. This disc has perforations passing through it. These perforations are made appreciably on the periphery of the disc, along a same circle. The disc demarcates two compartments within the box. One of these compartments communicates with the outlet of the reservoir 38 and a seed distribution channel which opens out between the disc openers 36. The other compartments communicate by means of a tube with an inlet of a suction fan 40 fixedly attached to the frame 32.

The suction fan 40 comprises several inlets, each of which can be connected to pneumatic distribution means 39 of the different seeding elements 31 of the seeder 30. The suction fan 40 has an air discharge outlet 41 pointed upwards, in other words appreciably towards the sky when the seeder 30 rests on the ground.

The seeder 30 comprises means for extracting the air coming from the suction fan 40. These means for extracting comprise a conduit 42, the inlet 421 of which is connected to the discharge outlet 41 of the suction fan 40. The outlet 422 of the conduit 42 leads out to face the ground S at a distance D ranging from 20 to 30 centimeters from the surface of the ground. It therefore extends along an axis that is essentially perpendicular to the surface of the ground S and opens out in proximity to the ground.

Figure 6:
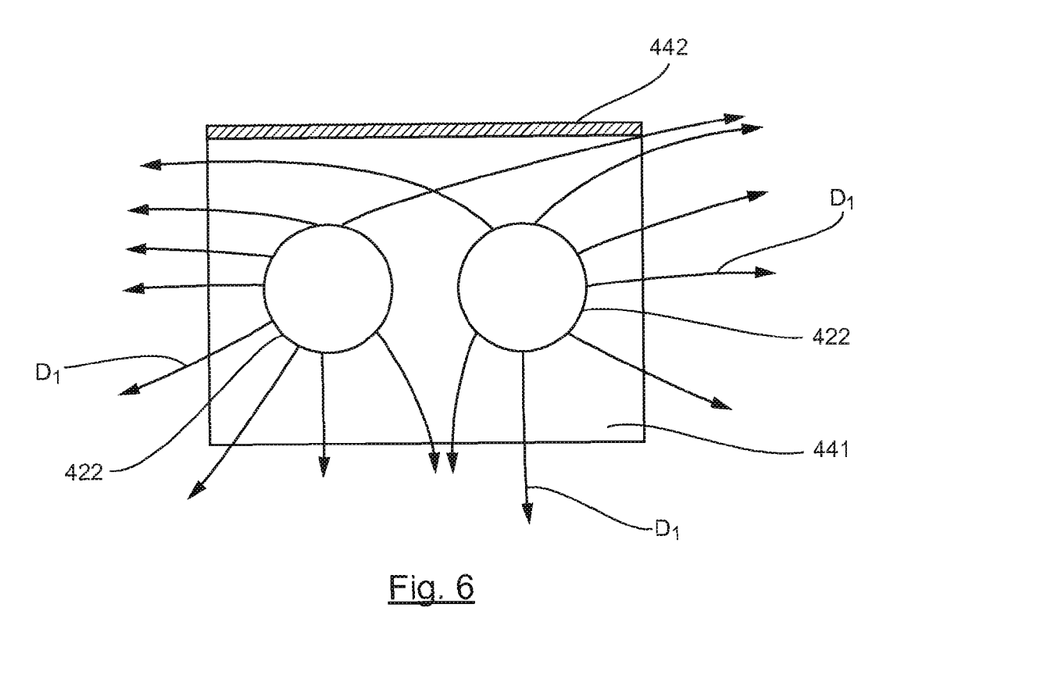
FIG. 6 illustrates the diverted flow of air extracted from the suction fan of the pneumatic seeder illustrated in FIGS. 2, 3 and 4.

In this embodiment, an optional decompression box 43 is placed on the conduit 42 upstream from the outlet 422. In this case, the outlet 422 is a dual outlet as is shown more clearly in FIG. 6.

The seeder 30 comprises means for damping and/or diverting the flow of air extracted from the suction fan 40 through the conduit 42.

In this embodiment, these means for damping and/or diverting include a deflector 44. This deflector 44 comprises a first wall 441 which extends essentially horizontally, i.e. essentially in parallel to the surface of the ground S. It also comprises a second wall 442 which extends essentially perpendicularly to the first wall 441. The deflector 44 therefore has an essentially L-shaped section, with one arm of the L constituting the first wall 441 while the other arm constitutes the second wall 442. The second wall 442 extends on the side of the tractor on which the seeder 40 has to be fixedly attached. The first wall 441 herein is an element forming an obstacle downstream from the end or outlet 422, in other words between the outlet 422 and the surface of the ground.

The deflector 44 could for example be made of rubber, plastic, woven or non-woven material (a bunch of lengthy fibers made of plastic), or any other appropriate, appreciably flexible material.

The dimensions of the deflector 44 are preferably chosen so that they come into contact with the surface of the ground S as shown in FIG. 4. In this case, it preferably has a certain degree of flexibility. It then constitutes a sort of flexible flap which rubs along the surface of the ground.

The deflector 44 is fixedly attached to the decompression box 43. In certain variants it could for example be fixedly attached to the frame 32.

As shall be explained further below, the deflector 44 makes it possible for example to dampen and/or divert and/or slow down and/or split up the flow of air extracted from the suction fan 40 through the conduit 42 after it has passed the end 422, also called an outlet, of the means for extracting before it meets the ground.

6.2.2. Variants

In variants, the suction fans 40 could include several discharge outlets 41, each connected to means for extracting provided with means for damping and/or diverting according to an embodiment of the invention.

6.2.3. Operation

When the suction fan 40 is implemented so as to provide for the distribution of seeds through the distribution means 39, the air A which is extracted therefrom through the discharge outlet(s) 41 flows in the conduit 42 and then escapes from it from the outlet 422. This flow of air then comes into contact with the walls 441, 442 of the deflector 44 against which it is at least partly dampened and/or diverted and/or split up and/or slowed down, i.e. its kinetic energy is at least partly absorbed by the deflector. The speed of the flow of air is thus reduced. In this embodiment, the flow of air is also partially diverted along the set of directions D1 essentially parallel to the surface of the ground S and/or inclined in a direction opposite the surface of the ground, as is illustrated schematically in FIGS. 4 to 6. More generally, the means for damping and/or diverting can divert the flow of air coming from the outlet of the extraction means along at least one direction that is not directly oriented towards the surface of the ground S, in other words in a direction not perpendicular to the surface of the ground S, i.e. at least partly inclined relatively to the ground advantageously, towards the top and preferably essentially in parallel to the surface of the ground.

Figure 5:
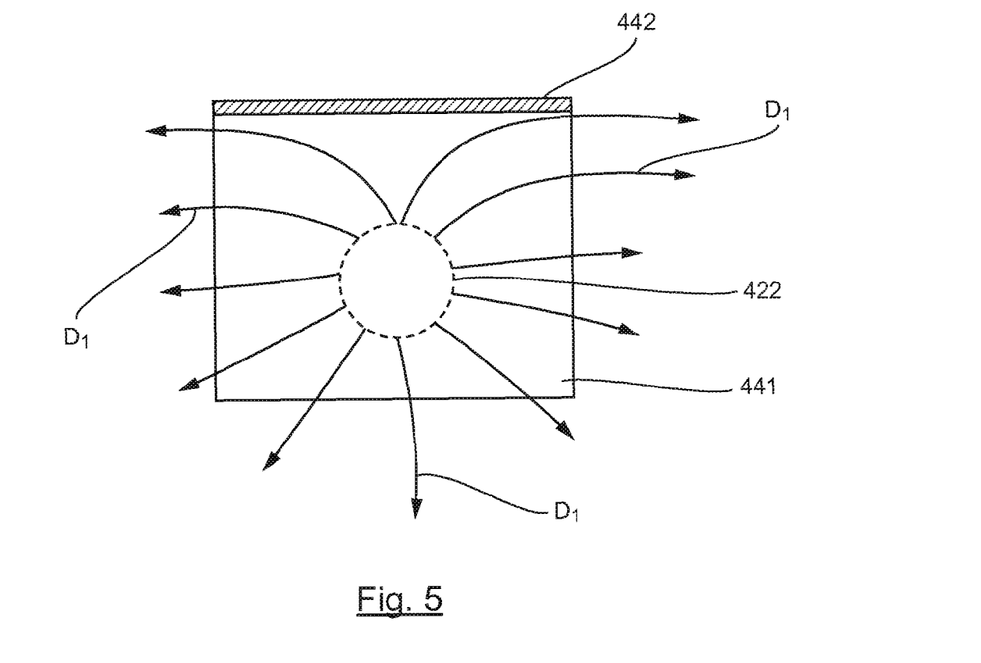
FIG. 5 illustrates the diverted flow of air extracted from the suction fan of a pneumatic seeder illustrated in FIGS. 2, 3 and 4 not implementing any decompression box upstream from the end of the extraction means.

When a decompression box 43 is not placed upstream to the end 422 of the means for extracting, the flow of air can be like that illustrated in FIG. 5.

6.3. Example of a Second Embodiment of a Seeder According to the Invention

6.3.1. Architecture

Figure 7:
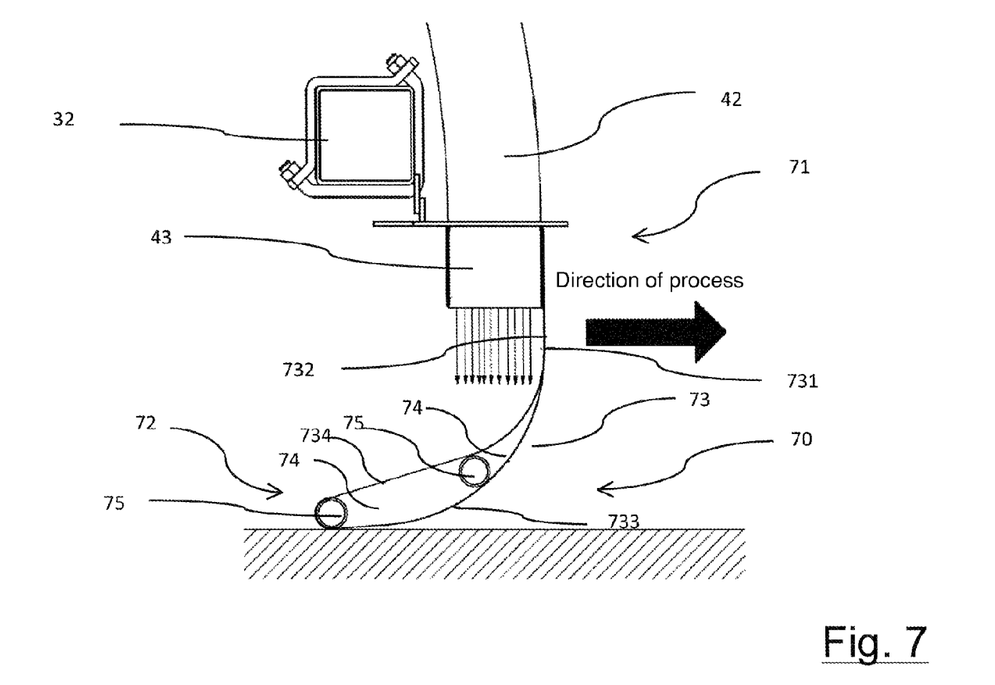
FIG. 7 illustrates a side view detailing the means for damping and/or diverting according to a second embodiment.
Figure 8:
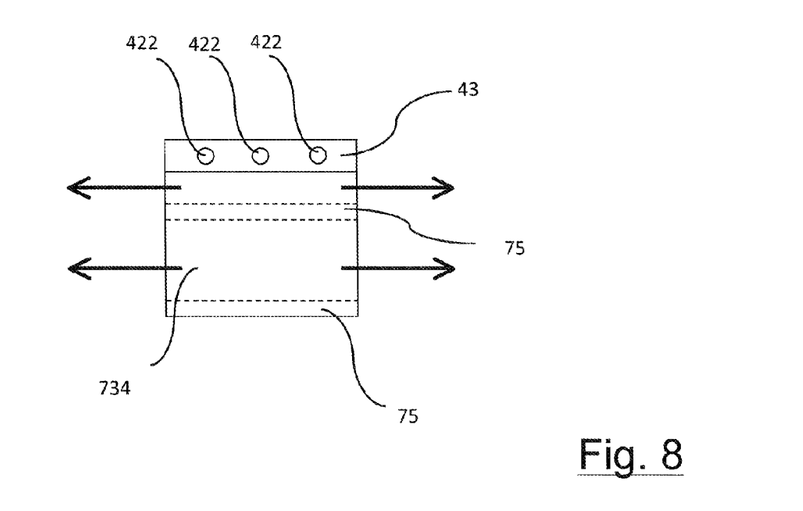
FIG. 8 illustrates a bottom view in perspective of a variant of the embodiment of FIG. 7.
Figure 9:
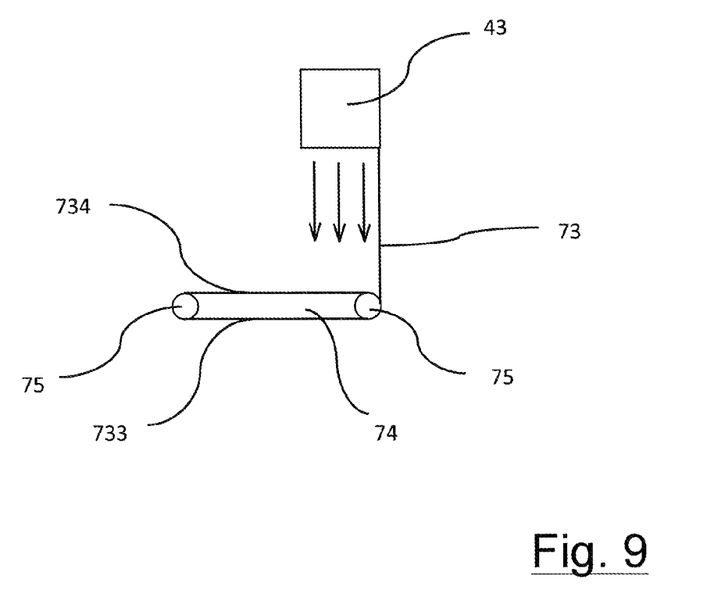
FIG. 9 illustrates the diverted flow of air from the turbine of the seeder according to the second embodiment.

Referring to FIGS. 7 to 9, a second embodiment is presented of a seeder according to the invention. These FIGS. 7 to 9 represent only the means for damping and/or diverting the flow of air extracted from the turbine 40. The description of this second embodiment will therefore be limited to that of these means for damping and/or diverting. Besides, the seeder according to this second embodiment is identical to the seeder according to the first embodiment and its variants.

As shown in FIG. 7, the means for damping and/or diverting include a flap 70 in this embodiment.

This flap 70 comprises a first end 71 which is designed to be fixedly attached in proximity to the output of the conduit 42 and especially in the region of its outlet 422. This first end 71 is herein fixedly attached to a wall of the decompression box 43. It could be fixedly attached to another position of the seeder. The flap 70 has a second end 72 which is designed to rest at least partly on the ground S.

The flap 70 comprises a sheet 73, of which two opposite free ends 731, 732 are fixedly attached to each other to demarcate a hollow, interior space 74. In this embodiment, its two free ends 731, 732 are fixedly attached to each other at the first end 71 of the flap 70. In variants, they could be fixedly joined to each other at another position of the flap 70.

The other two free ends of the flap 70 are not connected so that the hollow, interior space 74 is open and not closed laterally, i.e. on either side of the flap 70 relative to the axis of progress of the seeder. In variants, these other two opposite ends could also be fixedly joined to each other. The hollow interior space 74 will then be a closed space. It could have one or more holes for the discharge of internal air. The number and/or the size of these holes will be determined to adjust the level of damping given by the flap 70.

In variants, the flap 70 could include two sheets fixedly attached, two by two, by two of their opposite ends (with the interior space open) or, as the case may be, by all four ends (with the interior space closed).

The flap 70 comprises a lower sheet portion 733 pointed towards the ground S and designed to come at least partly in contact with the ground S, and an upper sheet portion 734 on which the air flow coming from the means for extracting is designed to flow, these lower 733 and higher 734 sheet portions being held at partly at a distance from each other so as to prepare a hollow interior space 74 between them. To this end, spacers 75 are placed between the lower 733 and upper 734 sheet portions.

These spacers 75 extend essentially perpendicularly to the direction of the progress of the seeder, and essentially parallel to the ground S. Each spacer 75 herein comprises a tube, for example made out of plastic, that could be rigid or have a certain elasticity. These spacers 75 are herein two in number. In variants, their number could be greater, especially depending on the size of the flap 70. Depending on the number of spacers used, the hollow interior space 74 could include several hollow interior spaces 74 as is shown especially in FIG. 7. As shall be described in greater detail here below, the spacers 75 herein also fulfill a flow-guide function.

The sheet 73 of the flap 70 is made out of a flexible material. It could for example be an elastomer type plastic such as natural or synthetic rubber or the like. It could also be a textile type material.

Figure 10:
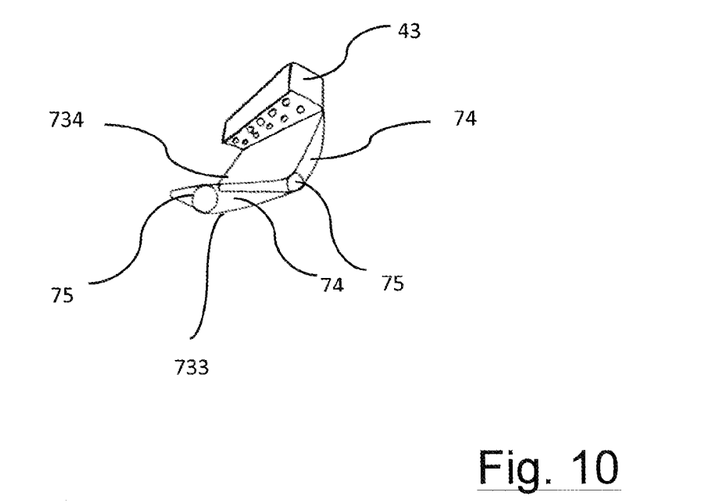
FIG. 10 illustrates a variant of the second embodiment.

The first end 71 of the flap 70 extends essentially perpendicularly to the surface of the ground S. The rest of the flap 70 extends essentially in the form of an arc of a circle that rests on the ground in a zone proximate to the second end 72. In variants, this shape could be different. It could, for example, be a substantially L shape, the portion of the "L" substantially parallel to the ground defining a hollow interior space (cf. FIG. 10). The first end 71 of the flap 70 is fixedly attached in the region of the outlet 422 of the conduit 42 on the side oriented towards the vehicle to which the seeder is fixedly attached, i.e. the side oriented towards the direction of progress.

In the embodiment illustrated in FIG. 8, the decompression box 43 placed at the outlet of the conduit 42 has several ends 422 serving as air outlets. In variants, the decompression box could comprise only one outlet, as is the case for example with the one illustrated in FIG. 5. In other variants, it will be possible to implement no decompression box.

6.3.2. Operation

When the turbine 40 is implemented so as to provide for the distribution of seed via the distributing means 39, the air A that is extracted therefrom via the discharge outlet(s) 41 flows into the conduit 42, and then escapes therefrom by the outlet (s) 422. This air flow then comes into contact with the upper sheet portion 734 of the flap 70 against which it is at least partly dampened and/or diverted and/or divided and/or slowed down, i.e. its kinetic energy is at least partly absorbed by the deflector. The speed of the air flow is thus reduced.

Given the fact that the flap 70 is flexible and defines an interior hollow space 74, it is a kind of a damping cushion against which the air flow is dampened. The fact that the lower portion 733, shaped like an arc of a circle of the flap, is in contact with the ground essentially at the level of the second end 72 of the flap, ensures that there is a space between the ground and a portion of the flap 70. This space enables the flap to get deformed under the effect of the air flow coming from the turbine, thus improving the damping effect.

Owing to the implementation of the spacers 75, which herein extend along an axis substantially perpendicular to the axis of progress of the seeder and substantially parallel to the surface of the ground S, the direction of air flow is diverted so that it tends to flow on either side of the flap 70 in directions essentially parallel to the axes of the spacers 75 illustrated by the arrows in FIG. 9. The spacers 75 therefore play a part in favoring the flow of air laterally and not towards the rear of the seeder.

6.4. Advantages

The means for damping and/or diverting according to an embodiment of the invention prevent the formation of a cloud of dust around the seeder and especially prevent a shifting of dust in the direction of movement of the seeder, i.e. in the direction of the machine used to move it on the ground S.

An exemplary embodiment of the disclosure provides a technique for limiting the propagation into the atmosphere of potentially harmful particles with which the air expelled by the suction fan of a pneumatic seeder is charged.

An embodiment implements a technique of this kind that makes it possible to limit the raising of dust coming from a seeder during a seeding operation.

An embodiment provides a technique of this kind which is simple to design and implement and/or robust and/or low in cost.

Although the present disclosure has been described with reference to one or more examples, workers skilled in the art will recognize that changes may be made in form and detail without departing from the scope of the disclosure and/or the appended claims.

The invention claimed is:

1. A pneumatic seeder configured to be fixedly attached to a farming machine, said seeder comprising:
   linking means to the ground,
   means for storing a product to be sown,
   means for pneumatic distribution of said product,
   a suction fan comprising at least one air inlet connected to said means for distribution and at least one air discharge outlet,
   means for extracting air connected to said discharge outlet, wherein an end of said means for extracting air leads out to face the ground, and
   a flexible flap forming an obstacle between the end of said means for extracting air and the surface of the ground along which the flap is designed to rub, which dampens and/or diverts the flow of air coming from said means for extracting, said flexible flap being placed downstream from the end of said means for extracting air.

2. The seeder according to claim 1, wherein said flexible flap comprise a first wall extending essentially in parallel to the ground downstream from said end.

3. The seeder according to claim 1, wherein said flexible flap has a wall that is configured to rest at least partly on the surface of the ground.

4. The seeder according to claim 2, wherein the flexible flap has an essentially L-shaped section, said first wall being constituted by one arm of said element.

5. The seeder according to claim 1, wherein said flexible flap is made out of a flexible material that belongs to the group consisting of:
   elastomers;
   foams;
   woven or non-woven materials.

6. The seeder according to claim 1, wherein said means for damping and/or diverting comprise a superimposition of a plurality of screens extending essentially in parallel to the ground downstream from said end.

7. The seeder according to claim 6, wherein said screens have a mesh size that decreases from the screen closest to said end up to the screen closest to said ground.

8. The seeder according to claim 6, wherein said screens have a mesh size that increases from the screen closest to said end up to the screen closest to said ground.

9. The seeder according to claim 1, wherein the end of said means for extracting opens out at a distance D from the ground ranging from 20 to 30 centimeters.

10. A pneumatic seeder configured to be fixedly attached to a farming machine, said seeder comprising:
   at least one wheel for linking to ground,
   a reservoir for storing a product to be sown,
   a pneumatic distributor of said product,
   suction fan comprising at least one air inlet connected to said pneumatic distributor and at least one air discharge outlet,
   an air extractor configured to extract air connected to said discharge outlet, wherein an end of said air extractor leads out to face the ground, and
   at least one flexible flap forming an obstacle between the end of said air extractor and the surface of the ground along which the flap is designed to rub, which forms a damper or diverter configured to dampen and/or divert a flow of air coming from said air extractor and which is placed downstream from the end of said air extractor.

* * * * *